US006803860B1

United States Patent
Langner et al.

(10) Patent No.: US 6,803,860 B1
(45) Date of Patent: Oct. 12, 2004

(54) COCKPIT CONTROL SYSTEMS AND METHODS OF CONTROLLING DATA ON MULTIPLE COCKPIT INSTRUMENT PANELS

(75) Inventors: Dale Langner, Olathe, KS (US); Philip I. Straub, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 10/086,929

(22) Filed: Feb. 28, 2002

(51) Int. Cl.$^7$ .................. G01C 21/00; G01C 23/00
(52) U.S. Cl. ............................. 340/971; 340/945
(58) Field of Search ............................. 340/971, 974, 340/963, 945; 701/3, 14

(56) References Cited

U.S. PATENT DOCUMENTS

| | | | | |
|---|---|---|---|---|
| 2,412,350 A | * | 7/1946 | Morgan | 340/870.11 |
| 4,845,495 A | * | 7/1989 | Bollard et al. | 340/973 |
| 5,883,586 A | * | 3/1999 | Tran et al. | 340/945 |
| 6,154,637 A | * | 11/2000 | Wright et al. | 455/66 |
| 6,281,810 B1 | * | 8/2001 | Factor | 340/971 |

* cited by examiner

Primary Examiner—John Tweel
(74) Attorney, Agent, or Firm—Devon A. Rolf

(57) ABSTRACT

Systems and methods for cockpit control systems are provided. A sensor associated with a first display is adjustable and a first setting associated with the sensor is simultaneously displayed on the first display and a second display as the sensor is adjusted. Furthermore, a second sensor associated with the second display is adjusted and a second setting associated with the second sensor is simultaneously displayed on the second display and the first display. The first setting is adjustable from the second display, and the second setting is adjustable from the first display. Moreover, the first display provides backup should the second display fail, and the first sensor provides backup to the second sensor in event the second sensor fails.

28 Claims, 4 Drawing Sheets

COCKPIT CONTROL SYSTEMS AND METHODS OF CONTROLLING DATA ON MULTIPLE COCKPIT INSTRUMENT PANELS

CROSS-REFERENCE TO RELATED APPLICATIONS

This application is related to the following co-pending, commonly assigned U.S. patent applications: "Cockpit Instrument Panel Systems and Methods of Presenting Cockpit Data," Ser. No. 10/086,951; "Cockpit Instrument Panel Systems and Methods with Redundant Critical Flight Data Display," Ser. No. 10/086,783; "Cockpit Display Systems and Methods of Presenting Data on Cockpit Displays," Ser. No. 10/086,598; A Cockpit Instrument Panel Systems and Methods with Variable Perspective Flight Display, Ser. No. 10/086,573; A Customizable Cockpit Display Systems and Methods of Customizing the Presentation of Cockpit Data, Ser. No. 10/086,996, each of which is by the same inventors and of which the disclosure is herein incorporated by reference in its entirety.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the screen layouts, and data as described below and in the drawings hereto: Copyright © 2002, Garmin Corporation, All Rights Reserved.

FIELD OF THE INVENTION

The present invention relates generally to cockpit control systems and methods of controlling data on multiple cockpit instrument panels. In particular, the present invention is directed to integrating cockpit controls and control setting data across multiple cockpit instrument panels.

BACKGROUND OF THE INVENTION

Modern commercial/private aircraft, as well as older aircraft, include a myriad of instrumentation panels having controls and displays used to present information related to aircraft sensors. The controls and the displays are operated, viewed, and interpreted by a pilot/copilot during flight of an aircraft. Some of these controls are used for assisting the pilot/copilot with navigation, such as an altimeter, an airspeed indicator, a horizontal situation indicator, an attitude indicator, and the like. Other controls are used to permit radio communication with other pilots/copilots in the air or with air traffic controllers during flight. Still more controls, in recent years, are used to assist in navigation using Global Positioning Satellite (GPS) systems associated with satellite technology. Furthermore, transponder controls permit the aircraft to be uniquely identified and the aircraft's altitude communicated to air traffic controllers during flight.

For a neophyte, the quantity of controls and display panels contained within the cockpit of an aircraft are daunting. Even experienced pilots/copilots must stay focused and alert in order to access various controls within the cockpit and interpret information presented on various displays throughout the cockpit. As a result, pilots/copilots must continually scans a plurality of available displays for vital flight information at any particular moment in time during flight.

In recent years, flight management systems (FMS) have emerged, where some controls within the cockpit have been centralized into a single location within the cockpit, usually located next to the seat of the pilot. With a FMS, the pilot can tune various controls associated with displays located throughout the cockpit. Yet, the pilot is still forced to access controls which are physically separated from the displays, and multiple displays still exist within the cockpit. Additionally, the pilot often cannot access both the controls and the displays at the same time.

Also in recent years, multifunction displays (MFDs) have been developed, such that a single display screen presents control data associated with a select few controls within the cockpit. However, the controls are not integrated into the bezel which surrounds the MFDs, nor are the controls in close proximity to the MFDs. Moreover, the MFDs are limited to presenting data related to only a few select controls within the cockpit. Correspondingly, the pilot must still manage a myriad of displays and controls located at various locations throughout the cockpit.

Furthermore, the Federal Aviation Association has promulgated regulations requiring that some sensors have backup sensors and have backup presentation on multiple displays within the cockpit in the event a primary control or display, presenting any setting data associated with the controls, should fail during flight. Backup is especially important for communication sensors and navigational sensors, since these sensors vitally assist a pilot during flight. Generally, these sensors are set as radio frequencies, although in recent years GPS sensors provide additional navigational information. Furthermore, one or more channels are generally required for both communication and navigation within the aircraft during flight. These channels are recognized by those skilled in the art as acronyms COM1, COM2, NAV1, and NAV2. A variety of controls within the cockpit are associated with COM and NAV communication sensors.

Yet, existing cockpit control systems and cockpit instrument panels do not provide seamless integration with respect to COM1, COM2, NAV1, and NAV2 controls. As a result, the pilot is forced to manually switch to alternate displays and controls in the event of a sensor or a display failure. Further, the pilot is often forced to view multiple display screens to obtain all the relevant setting data associated with the controls. Moreover, the plethora of controls and displays often occupy a large amount of physical space within the cockpit of an aircraft, and physical space within the cockpit is often a precious commodity.

As is apparent to those skilled in the art, a pilot/copilot must remain alert and focused on controls and displays at important points during the flight, such as takeoffs, landings, inclement weather, emergencies, or equipment malfunctions. Thus, pilots/copilots are required to have many hours of training to master the controls and displays within the cockpit before receiving the proper certification to fly an aircraft. This is especially true with larger commercial aircrafts. Moreover as a result of the heightened mental acuity required during flight, many federal regulations also restrict the amount of time a pilot/copilot is permitted to fly in any given day in order to ensure the pilot/copilot remains alert during flight.

Therefore, there exists a need for a better integrated and backup cockpit control systems within the cockpit, which permits the pilot/copilot to more rapidly acquire vital information and to manage the controls related to that information from central locations. Moreover, there exists a need for better control and presentation of sensor settings during flight.

SUMMARY OF THE INVENTION

The above-mentioned problem is related to cockpit control systems and methods of controlling data on multiple cockpit instrument displays are addressed by the present invention and will be understood by reading and studying the following specification. Systems and methods are provided for cockpit control systems and cockpit data controlled on multiple cockpit instrument displays, which are more efficient and accurate than current cockpit control systems and current cockpit instrument displays. The systems and methods of the present invention offer improved cockpit control systems and provide for a more integrated presentation of sensor settings associated with cockpit instrument controls. Furthermore, the present invention offers an improved recovery and backup system in the event of a cockpit instrument sensor or display failure by providing redundant controls on multiple cockpit instrument panels within the cockpit, wherein the controls work in concert with one another as a single integrated control.

In one embodiment of the present invention, a cockpit control system is provided. The system includes first and second communication sensors and first and second navigational sensors. Moreover, the system has first and second displays, with each display operable to simultaneously present control setting data associated with each of the sensors.

In still another embodiment of the present invention, another cockpit control system is provided. The system has a first control associated with a first display system operable to adjust one or more settings associated with a sensor and a second control associated with a second display system operable to adjust one or more of the settings associated with the sensor. Further, the system includes a controller that simultaneously presents one or more of the settings on the first display system and the second display system when either the first control or the second control adjusts one or more of the settings for the sensor.

In yet another embodiment of the present invention a method to control data on multiple cockpit instrument panels is provided wherein first setting data associated with a first cockpit panel is adjusted. Also, second setting data associated with a second cockpit panel is adjusted. The first setting data are concurrently displayed on the first and second cockpit panels, and the second setting data are concurrently displayed on the first and second cockpit panels.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

Figure 1A:
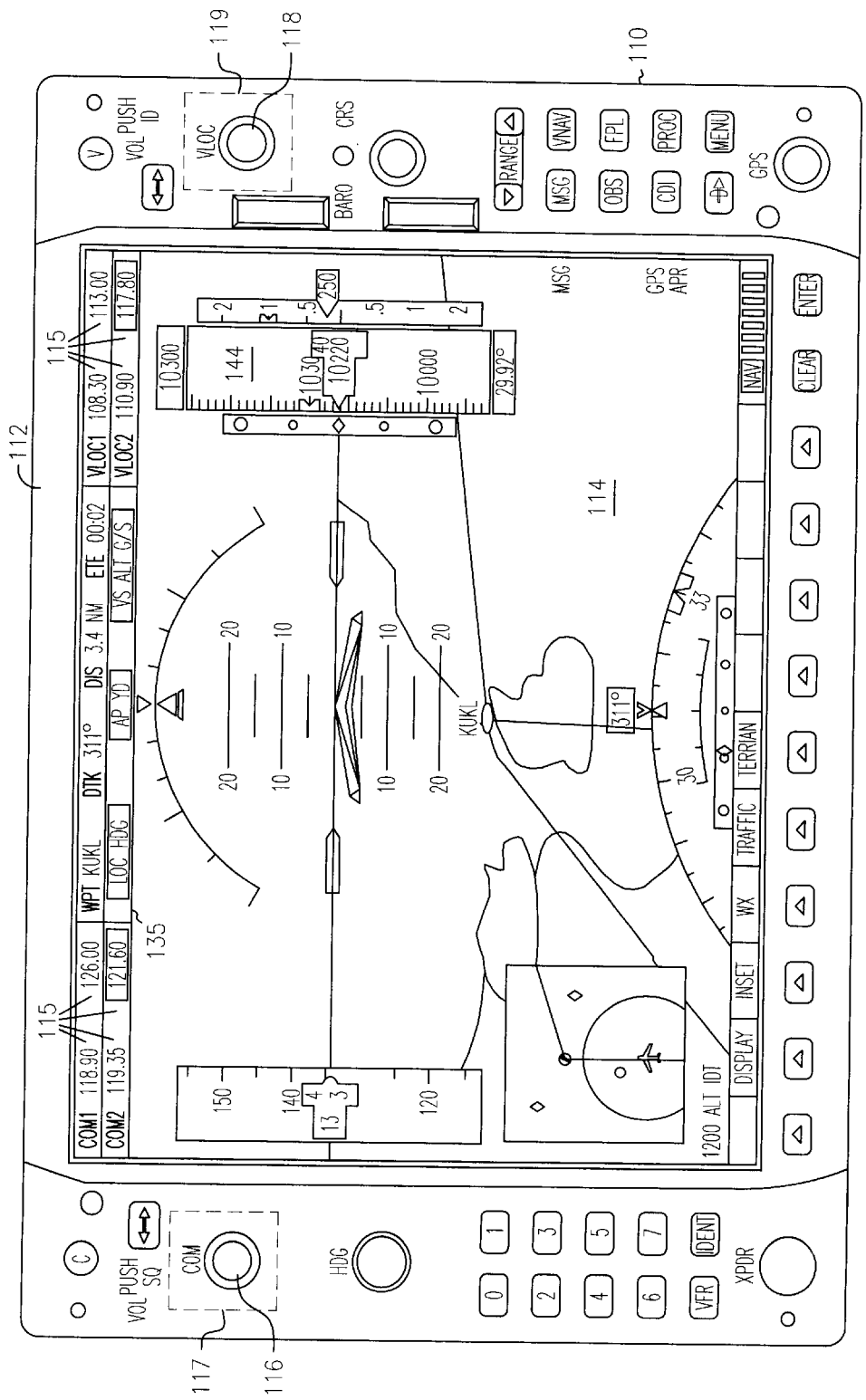
FIG. 1A is cockpit control system according to the teachings of the present invention.

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

In the present invention, improved multifunction displays (MFDs) are provided. As used herein, a MFD is used broadly to include graphical user interface based (GUI-based) displays with integrated presentation data presented thereon using a variety of views. The views are configured on the MFDs to provide ready access to flight information data. In some embodiments of the present invention the use of the term MFD is employed in connection with or to refer to a primary flight display (PFD). In some embodiments of the present invention the use of the term MFD is employed in connection with or to refer to a navigation display (NAV display). Additionally, in some embodiments, multiple MFDs are included such that a first MFD is principally used as a PFD and a second MFD is principally used as a NAV display. In such embodiments, the second MFD or NAV display is in compliment to the PFD. In the present invention, multiple MFDs can be stacked one upon the other, or alternatively arranged side by side. Further, in some embodiments an MFD is adapted to include audio capabilities. As one of ordinary skill in the art will appreciate upon reading this disclosure, the flight information data which is presented on such MFDs can differ based on the aircraft type, e.g. frame and engine type.

In the invention, a "bezel" is provided as part of the MFDs. Typically, the bezel is the framed perimeter that surrounds a display, but is not part of the display itself. Further as used in this application, control data and instrumentation data, including flight information data, refer to data received by sensors coupled to input devices, such as communication and navigational input devices, and data received from various equipment and sensors, such as the aircraft engine, fuel, airspeed, altitude and attitude sensors. For example, navigational and communication sensors tune navigational devices (e.g., VLOC receivers, radios, and the like) within the aircraft and permit software operating on a processing device to receive and process the communication and navigational data collected by such devices. Equipment and sensor instrumentation facilitate the presentation of data relating to such parameters as aircraft engine, fuel, airspeed, altitude and attitude status.

In the present invention, this data can be operated on by software to generate one or more dynamic images on the GUI of a MFD display. As one of ordinary skill in the art will understand upon reading this disclosure, the display is capable of presenting text or graphical information. In some embodiments, the display of provides image or video data. In one example, the GUI depicts a present movement, path and/or projected destination of an aircraft relative to locations on the ground along with airspeed, altitude, attitude and engine status data. As one skilled in the art will appreciate, input devices such as communication and navigation sensors include settings such as a current radio frequency, channel, and the like.

Although specific cockpit sensors, tuning controls, and particular flight information data are described herein, these descriptions are presented by way of example only and a not intended to limit the scope of the present invention. As one of ordinary skill in the art will understand upon reading this disclosure, any existing or custom sensors, controls, and flight information data are readily integrated with one or more nultifunction displays (MFDs) according to the teachings of the present invention. And, any combination and arrangement of the MFDs and the flight information data presented thereon are intended to fall within the scope of the present invention. According to the teachings of the present invention, flight information data is available at all times. As one of ordinary skill in the art will understand upon reading this disclosure, the MFDs are positioned within the cockpit so that a pilot can view and access communication and navigation controls proximately located to the MFDs at all times during flight.

Moreover as previously presented, during flight four sensors typically associated with a variety of controls are vitally important during flight, these four controls include two communication radio controls commonly recognized by one of ordinary skill in the art by the generic acronyms of COM1 and COM2. The remaining two sensors assist in providing navigational data to various instruments located throughout the cockpit and are commonly recognized by one of ordinary skill in the art by controls associated with the generic acronyms of NAV1 and NAV2. Although for purposes of illustration the NAV1 and NAV2 controls are discussed as being associated with radio frequency data communication, as one skilled in the art will appreciate NAV1 and NAV2 in some embodiments are associated with satellite communication. Furthermore, in some embodiments COM1 and COM2 provide voice communications via a satellite, rather than via a radio frequency.

Figure 1B:
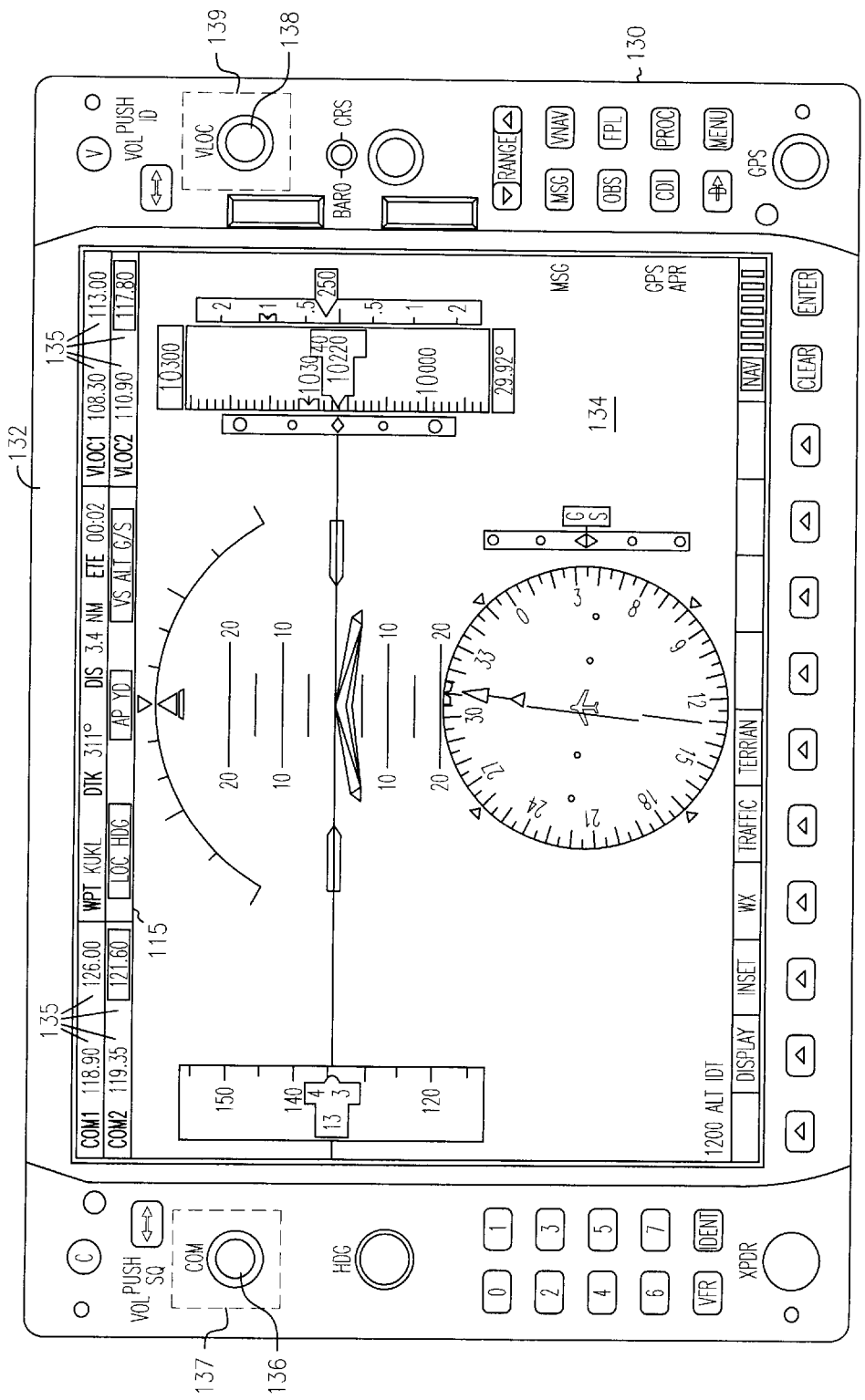
FIG. 1B is another cockpit control system according to the teachings of the present invention.

FIGS. 1A and 1B illustrate an example of a cockpit control system according to the teachings of the present invention. The system includes a first communication sensor 117 and a second communication sensor 137 and a first navigational sensor 119 and a second navigational sensor 139. The first communication sensor 117, in some embodiments, is adjusted by a single communication control 116 located on a first bezel 112 of a first cockpit instrument panel 110. Likewise, the first navigational sensor 119, in some embodiments, is adjusted by a single navigational control 118 located on the first bezel 112 of the first cockpit instrument panel 110.

In FIGS. 1A and 1B and in some embodiments, the first communication sensor 117 and the first navigation sensor 119 are affixed to a rear side of the first bezel 112 and include the necessary circuitry to control/adjust the communication devices and the navigational devices of an aircraft. Similarly, the second communication sensor 137 and the second navigational sensor 139 are affixed to a rear side of a second bezel 132 associated with a second cockpit instrument panel 130.

Further, the second communication sensor 137, in some embodiments, is adjusted by a single communication control 136 located on the second bezel 132 of the second cockpit instrument panel 130. Also, the second navigational sensor 139, in some embodiments, is adjusted by a single navigational control 138 located on the second bezel 132 of the second cockpit instrument panel 130.

Although FIGS. 1A and 1B depict, by way of example only, single controls (e.g., 116, 118, 136, and 138), it is readily apparent that in some embodiments multiple controls are used to interface with the first communication sensor 116, the first navigational sensor 119, the second communication sensor 137, and the second navigational sensor 139. Moreover, in some embodiments such as the embodiment depicted in FIGS. 1A and 1B, multiple communication channels are achieved by depressing the first communication control 116 or the second communication control 136. Multiple navigational channels are also achieved by depressing the first navigational control 118 or the second navigational control 138. In some embodiments, a particular radio frequency is achieved by turning any of the controls (e.g., 116, 118, 136, or 138) in a clockwise or counterclockwise direction.

The first cockpit instrument panel 110 includes a display 114 operable to present the setting data 115 as any of the sensors (e.g., 117, 119, 137, or 139) are adjusted by any of the controls (e.g., 116, 118, 136, or 138). In some embodiments the display 114 is enclosed by the first bezel 112. Furthermore, a copy of the setting data 115 presented on cockpit instrument panel 110 via display 114 and is simultaneously presented as setting data 135 on display 134 of the second cockpit instrument panel 130. Additionally in some embodiments, the display 134 is enclosed by the second bezel 132. In this way, each display 114 and 134 simultaneously present setting data 115 and 135 which are identical and associated with adjustments of each of the sensors (e.g., 117, 119, 137, and 139) by adjusting any of the controls (e.g., 116, 118, 136, or 138).

As one skilled in the art will appreciate, the bezels 112 and 132 need not include four sides, such that the displays 114 and 134 are completely surrounded by sides of the bezels 112 and 132. In fact, a bezel 112 or 132 of the present invention need only include a single side which is proximately located to a display 114 or 134. And although FIGS. 1A and 1B depict sensors (e.g., 117, 119, 137, or 139) and controls (e.g., 116, 118, 136, or 138) as being physically configured on separate sides of separate bezels 112 and 132, the present invention is not intended to be so limiting.

For example, a single shared side of a single bezel can be proximately located between and adjacent to each display 114 and 134 with the sensors (e.g., 117, 119, 137, or 139) and the controls (e.g., 116, 118, 136, or 138) affixed thereto. Moreover, it will be readily understood by one of ordinary skill in the art that the sensors (e.g., 117, 119, 137, or 139) need not be physically attached and directly behind the controls (e.g., 116, 118, 1361 or 138). In fact in some embodiments, the sensors (e.g., 116, 118, 136, or 138) are affixed behind the one or both displays 114 and 134.

In still other embodiments, if the first display 114 should fail such that setting data 115 are not presented, then display 134 remains operational and accurately presents setting data 135 while any of the sensors (e.g., 117, 119, 137, or 139) are adjusted by any of the controls (e.g., 116, 118, 136, or 138). Further, even if first display 114 should fail, communication control 116 and navigational control 118 still remain operational to adjust the setting data 135 being presented on display 134. As one skilled in the art will readily appreciate, this provides redundant support in the event of display (e.g., 114 or 134) or sensor failure (e.g., 117, 119, 137, or 139), since multiple redundant displays (e.g., 114 and 134) and redundant controls (e.g., 116, 118, 136, and 138) are provided and interfaced with redundant sensors (e.g., 117, 119, 137, and 139).

Likewise the system, depicted in FIGS. 1A and 1B, provide backup in the event a sensor (e.g., 117, 119, 137, or 139) should fail. Correspondingly, any electronic circuitry associated with any of the controls is backed up with redundant sensors as well. As one skilled in the art will readily appreciate, by providing backup for displaying setting data via redundant displays, by providing dual operation with redundant controls, and by providing redundant sensors for each of the controls, added safety and security are achieved by ensuring that information and operational control, available to an operator of an aircraft, are not interrupted during flight.

Furthermore as was previously discussed, the layout of sensors (e.g., 117, 119, 137, and 139), controls (e.g., 116, 118, 136, and 138), and setting data (e.g., 115 and 135) is not intended to be restricted to the layout depicted in FIGS. 1A and 1B, since any configuration of sensors, controls, and presentation of setting data are intended to fall within the scope of the present invention.

As explained above in some embodiments, FIGS. 1A and 1B represent a cockpit radio tuning system, where first communication sensor 117 is identified as a communication radio system having first and second channels that are activated by depressing controls 116 or 136. Further, first navigational sensor 119 is identified as a navigational radio system having first and second channels that are activated by depressing controls 118 or 138. In other words, turning the controls adjust frequencies associated with each of the channels. These frequencies simultaneously appear on each display (e.g., 114 and 134) as setting data 115 and 135. For example, setting data 115, within FIG. 1A, associated with COM1 is set to a radio frequency of 118.90 and is identically presented as such in setting data 135 of display 134 in FIG. 1B. In this way, a pilot/copilot using control system, depicted in FIGS. 1A and 1B, has redundant setting data (e.g., 115 and 135) with multiple adjusting locations (e.g., controls 116, 118, 136, or 138).

In still other embodiments, the controls (e.g., 116, 118, 136, and 138) are voice activated controls, permitting the operator of the aircraft to interact with the sensors (e.g., 117, 119, 137, and 139) via voice commands. In such an embodiment, a specific control (e.g., 116, 118, 136, or 138) is activated and otherwise identified with an appropriate voice label to distinguish it from the remaining controls (e.g., 116, 118, 136, and 138). In yet more embodiments, the controls (e.g., 116, 118, 136, and 138) are wireless or infrared ports permitting other wireless devices which are remotely located to adjust the controls and correspondingly the sensors. In this way, portable electronic devices can be configured to interface with the controls (e.g., 116, 118, 136, and 138) of the present invention.

Figure 2:
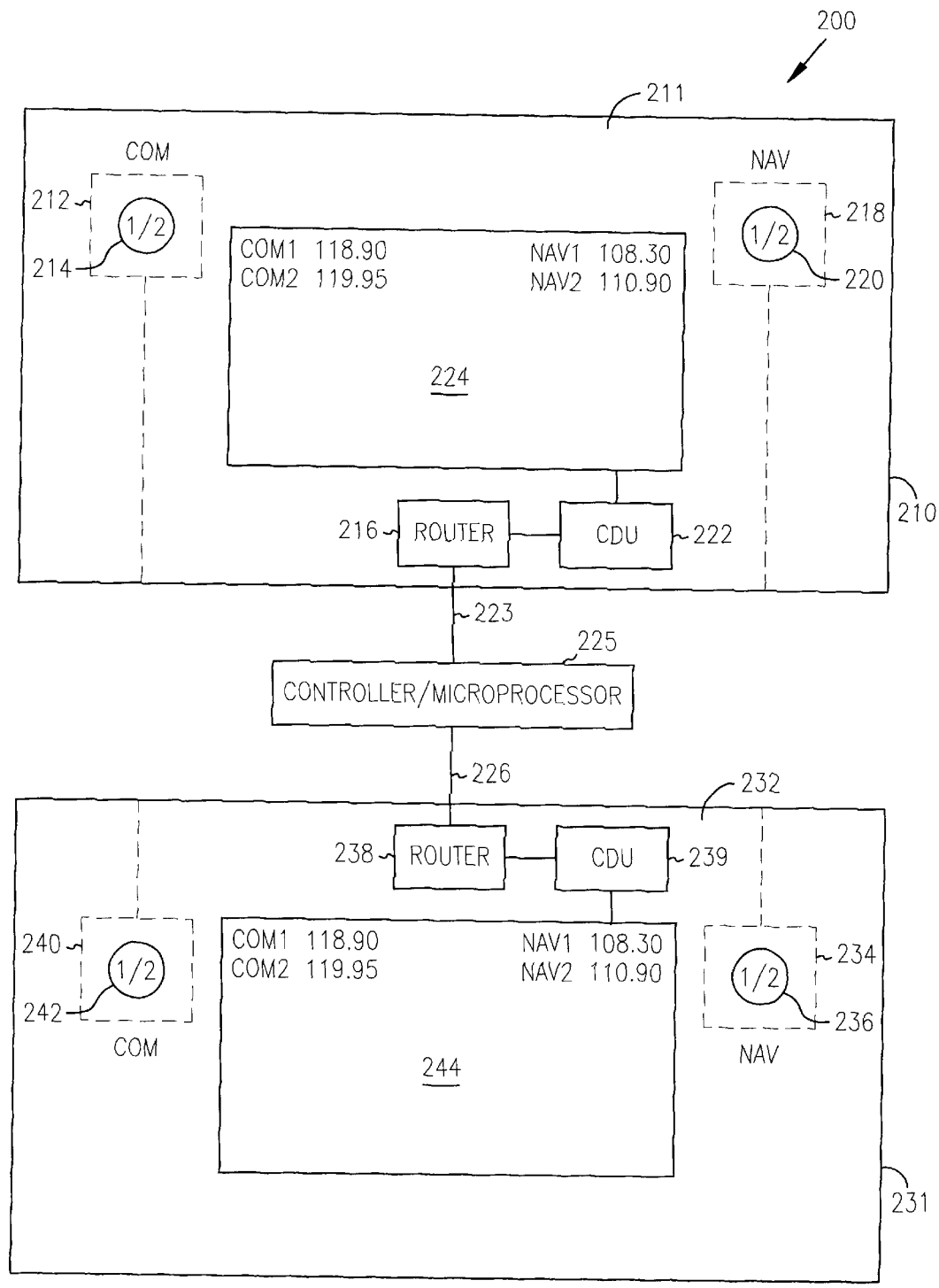
FIG. 2 is still another cockpit control system according to the teachings of the present invention.

FIG. 2 shows still another cockpit control system 200 according to the teachings of the present invention. System 200 includes a first control 214 associated with a first display system 210 and is operable to adjust one or more settings associated with a sensor 212. Furthermore, system 200 includes a second control 242 associated with a second display system 231 operable to adjust the sensor via duplicate sensor 240 interfaced through a controller 225.

The controller or microprocessor 225 communicates with the sensor 212 indirectly through connection 223 and with the duplicate sensor 240 through connection 226. As one skilled in the art will appreciate, connections 223 and 226, in some embodiments, are simple physical interfaces and protocols occurring between electro mechanical devices, such as an RS-232 interface connection which defines low speed serial data communications between electro mechanical devices.

Although as one of ordinary skill in the art readily recognizes any additional hardwired or wireless interfaces and data communication protocols can be deployed with various embodiments of the present disclosure. In one embodiment, the controller 225 uses connection and interface 223 and 226 to communicate with data routers/interpreters 216 and 238 (e.g., identifies the appropriate sensor being adjusted or modified). The data routers/interpreters 216 and 238 then communicate with control display unit device (CDUs) 222 and 239 to effectively communicate data communications being presented on displays 224 and 244. In still other embodiments, connections 223 and 226 are hardwired as a single circuit panel and separately interfaced to the first control 214 and the second control 242. Moreover, data communications occurring with each display system (e.g., 210 or 231) can, in some embodiments, be achieved with high speed data interfaces and connections such as, and by way of example only, ethernet interfaces and connections.

Controller/microprocessor 225 simultaneously presents one or more settings on a first display 224 of the first display system 210 and a second display 244 of the second display system 231 when either the first control 214 or the second control 242 adjusts one or more of the settings associated with the sensor 212 or the duplicate sensor 240. In fact in some embodiments, sensor 212 and 240 act as a single integrated sensor through controller/microprocessor 225.

Furthermore, in some embodiments controller 225 is implemented as a set of executable instructions executing on a microprocessor having volatile and/or nonvolatile memory. In still other embodiments, controller 225 is one or more electro-mechanical devices designed to, perform one or more logical instructions to interface sensor 212 and duplicate sensor 240 as a single logical and integrated sensor.

In still other embodiments, display system 210 includes a first additional control 220 operable to adjust one or more additional settings associated with tuning or adjusting an additional sensor 218. Moreover, a second additional control 236 associated with the second display system 231 is operable to adjust one or more of the additional settings associated with the additional sensor 218 through a duplicate additional sensor 234 via the controller 225. Again, the additional sensor 218 is interfaced with the controller 222 through connection 223 and the duplicate additional sensor 234 with the controller 225 via connection 226. In this way, the additional sensor 218 and the duplicate additional sensor 234 act as one logically integrated sensor even though each physically appears in separate display systems (e.g., 210 and 231). Further, the controller 225 simultaneously presents one or more of the additional settings on the first display 224 and the second display 244 when either the first additional control 220 or the second additional control 236 adjusts additional sensor 218 and/or the duplicate additional sensor 234.

In yet other embodiments,the first display system 210 includes a first bezel 211 surrounding the first display 224 with the first control 214 and the first additional control 220 affixed on the first bezel 211. Also in some embodiments, the second display system 231 includes a second bezel 232 surrounding the second display 244 with the second control 242 and the second additional control 234 affixed on the second bezel 232.

In still more embodiments, the sensor 212 and the duplicate sensor 240 are operational to provide a first communication channel (e.g., COM1) and a second communication channel (e.g., COM2). Access to each channel is achieved by depressing/turning first control 214 or second control 242. Likewise in some embodiments, additional sensor 218 and duplicate additional sensor 234 are operational to provide a first navigational channel (e.g., NAV1) and a second navigational channel (e.g., NAV2), by depressing/turning second control 242 or second additional control 236. Further, in some embodiments each channel is associated with channel values which represent the setting and additional setting data and are identified as radio frequencies.

In other embodiments, system 200 depicted in FIG. 2 is a single integrated cockpit instrument panel with controller 225 and sensors 212, 218, 240, and 234 obscured from the view of the pilot/copilot. Also, routers (e.g., 216 and 238) and CDUs (e.g., 222 and 239) are transparent and not visible to the pilot/copilot. This provides a more integrated control and presentation of setting data to the pilot during flight.

Furthermore, system 200 provides much needed backup support in the event of a failure by a display, such that if display 224 fails, display 244 provides a backup presentation of the setting data. Additionally, if any sensors (e.g., 212 or 218) of the first display system 210 fail, display system 231 provides the corresponding backup sensors (e.g., 240 and 234). Moreover, if any controls (e.g., 214 or 220) of display system 210 should fail, display system 231 provides control backup with the relevant controls (e.g., 242 or 236).

Moreover, in some embodiments a transponder control used for tuning or adjusting a transponder sensor is affixed to at least one of the bezels (e.g., 211 or 232). Additionally, in one embodiment an autopilot control used for tuning or adjusting an autopilot sensor is affixed to at least one of the bezels (e.g., 211 or 232).

Figure 3:
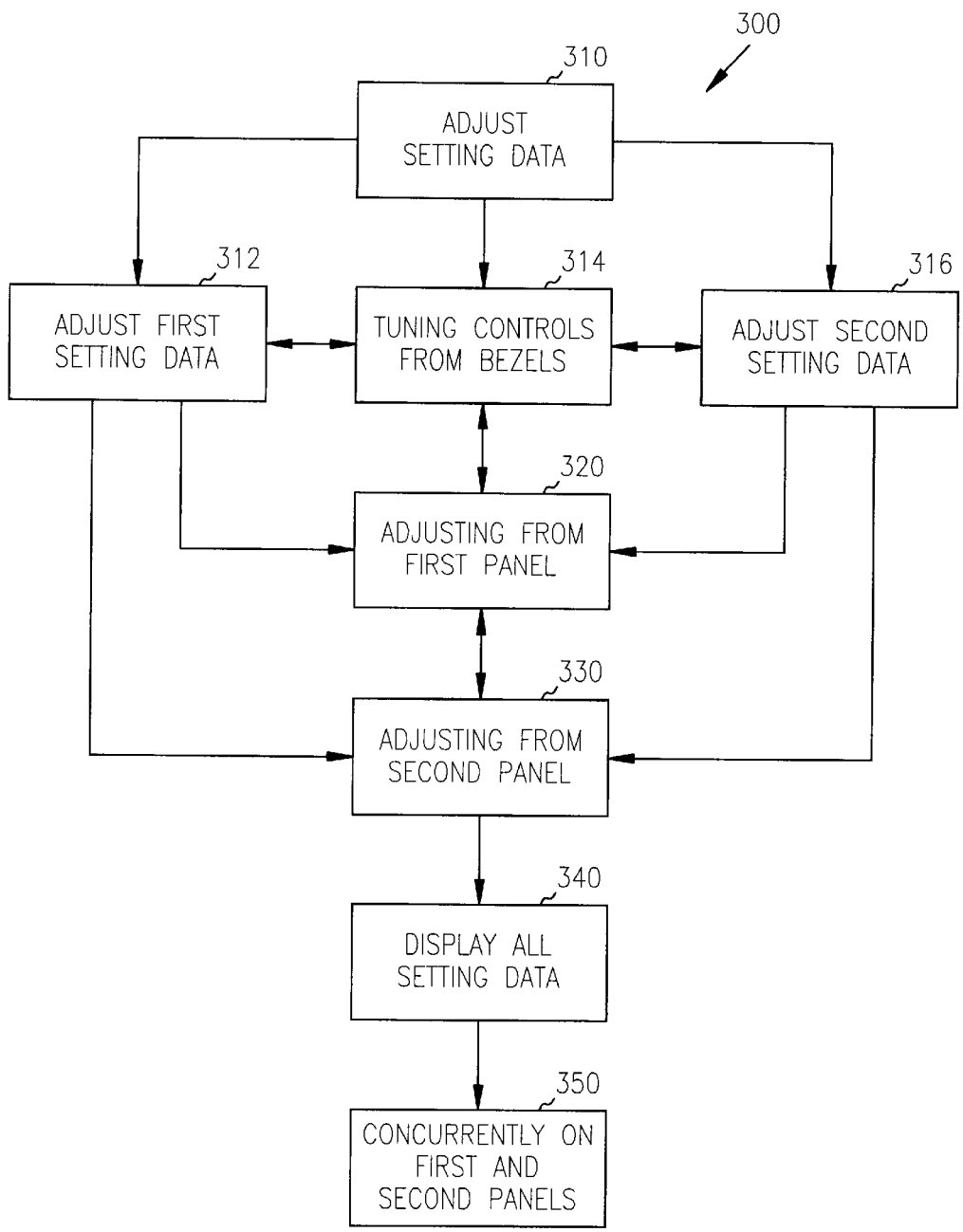
FIG. 3 is a flow diagram of a method to control data on multiple cockpit instrument panels according to the teachings of the present invention.

FIG. 3 shows one flow diagram of one method 300 to control data on multiple cockpit instrument panels according to the teachings of the present invention. Initially, in block 310 setting data are adjusted. Setting data include data associated with communication and navigation during flight of an aircraft. The setting data are adjustable as a first setting data originating from a first cockpit panel as depicted in blocks 312 and 320. Or, setting data are adjustable as second setting data originating from a second cockpit panel as depicted in blocks 316 and 330.

Furthermore, in some embodiments the first setting data are adjustable from the second cockpit panel as depicted in, blocks 312 and 330. Similarly, the second setting data are adjustable from the first cockpit panel as depicted in blocks 316 and 320. As is readily apparent, the first and second setting data are adjustable from either the first or second cockpit panels. Moreover, there is no requirement that the first setting data be adjusted before the second setting data since in some embodiments the second setting data are adjusted before and independent of an adjustment to the first setting data.

Additionally, whenever the first setting data are adjusted, the first setting data are displayed on both the first and second cockpit panels as depicted in blocks 340 and 350. Moreover, whenever the second setting data are adjusted, the second setting data are displayed on both the first and second cockpit panels (e.g., blocks 340 and 350). Furthermore and in still more embodiments, an override control on either the first or second cockpit panel provides the ability to disable the redundant data presentation, such that data is independently presented within the displays.

In other embodiments, the first setting data are associated with communication radio control frequencies within an aircraft, and the second setting data are associated with navigational radio control frequencies within the aircraft. In still other embodiments, the first setting data are adjusted by tuning a control in 314 on a first bezel which encompasses at least a portion of a first display of the first cockpit panel. In yet other embodiments, the second setting data are adjusted by tuning a control in 314 on a second bezel which encompasses at least a portion of a second display of the second cockpit panel.

In yet more embodiments, the first and second setting data are operable to be drawn or otherwise presented within the displays in text and/or graphical formats. The presentation of the first and second setting data include distinguishing visual cues such as and by way of example only, graphical lines or other shapes demarcating types of data being presented within the display, customized colors associated with types of data being presented within the display, or visual effects such as blinking text or graphical data associated with types of data being presented within the display.

As one of ordinary skill in the art will understand upon reading this disclosure, the methods of the present invention can be described in the context of computer-executable instructions, such as program modules, being executed by a computer. Generally, program modules include routines, programs, objects, components, data structures, etc. that perform particular tasks or implement particular abstract data types.

As one of ordinary skill in the art will understand upon reading and comprehending this disclosure, any one or more of the above features can be combined into a particular embodiment of the invention. Likewise, in the invention any one or a combination of the above functions can be optionally deactivated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, cause the processor to perform the respective method. In other embodiments, methods provided above are implemented as a set of instructions contained on a computer-accessible medium capable of directing a processor to perform the respective method. In varying embodiments, the medium includes a magnetic medium, an electronic medium, or an optical medium.

CONCLUSION

The above cockpit control systems and methods for controlling data on multiple cockpit instrument panels have been described, by way of example and not by way of limitation, with respect to improving pilot driven controls and pilot delivered information. That is, the control systems, and methods provide for better integrated control, backup access, and presentation of information within the cockpit. The control and proximate placement of duplicate sensors, duplicate controls, and duplicate displays of the present invention provide for improved flight safety by providing redundancy for important flight information, and by further alleviating the pilot's/copilot's dexterity and mental acuity required to operate existing cockpit instrument panels during flight. Moreover, the redundancy of the sensors, controls, and displays of the present invention occupies less physical space within a cockpit of an aircraft than what is required with conventional practices that may provide redundancy.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A cockpit control system, comprising:
   first and second communication sensors;
   first and second navigational sensors; and
   first and second displays, wherein each display simultaneously presents control setting data associated with each of the sensors, and wherein the displays are operable to present graphical information.

2. The system of claim 1, further comprising:
   a first bezel surrounding the first display; and
   a second bezel surrounding the second display.

3. The system of claim 2, wherein each of the sensors interface to each of the displays.

4. The system of claim 2, wherein each bezel includes a communication control and a navigational control affixed to each of the bezels.

5. The system of claim 4, wherein each of the communication controls on each of the bezels adjusts the first and second communication sensors and each of the navigational controls on each of the bezels adjusts the first and second navigational sensors.

6. The system of claim 2, further comprising a transponder control to adjust a transponder sensor, wherein the transponder control is affixed to at least one of the bezels.

7. The system of claim 2, further comprising an autopilot control to adjust an autopilot sensor, wherein the autopilot control is affixed to at least one of the bezels.

8. The system of claim 1, wherein, if the first display fails the second display provides backup, and if a first communication sensor fails the second communication sensor provides backup, and if the first navigational sensor fails the second navigational sensor provides backup.

9. The system of claim 1, wherein the sensors are associated with tuning radio frequencies.

10. A cockpit control system, comprising:
    a first control associated with a first display system operable to adjust one or more settings associated with a sensor;
    a second control associated with a second display system operable to adjust one or more of the settings associated with the sensor; and
    a controller that simultaneously presents one or more of the settings on the first display system and the second display system when either the first control or the second control adjusts one or more of the settings for the sensor, and wherein the first and second displays are operable to present graphical information.

11. The system of claim 10, further comprising:
    a first additional control associated with the first display system operable to adjust one or more additional settings associated with an additional sensor;
    a second additional control associated with the second display system operable to adjust one or more of the additional settings associated with the additional sensor; and
    wherein the controller simultaneously presents one or more of the additional settings on the first display system and the second display system when either the first additional control or the second additional control adjusts one or more of the additional settings.

12. The system of claim 11, where in the first display system includes a first bezel surrounding a first display with the first and first additional controls affixed on the first bezel.

13. The system of claim 12, wherein the second display system includes a second bezel surrounding a second display with the second and second additional controls affixed on the second bezel.

14. The system of claim 13, wherein the sensor includes a first communication channel and a second communication channel.

15. The system of claim 14, wherein the additional sensor includes a first navigational channel and a second navigational channel.

16. The system of claim 15, wherein the channels include channel values represented by the settings and the additional settings and further identified as radio frequencies.

17. The system of claim 10, wherein the system is a cockpit instrument panel.

18. A cockpit radio tuning system, comprising:
    a communication radio system having a first and second channel;
    a navigational radio system having a first and second channel;
    first and second communication radio system controls operable to adjust frequencies associated with the communication radio system's first and second channels;
    first and second navigational radio system controls operable to adjust frequencies associated with the navigational radio system's first and second channels; and
    first and second displays, wherein both displays are operable to simultaneously and independently present each of the frequencies for each of the channels on each of the displays as adjusted by each of the controls, and wherein both displays are operable to present graphical information.

19. The system of claim 18, further comprising:
    a first bezel surrounding the first display having the first communication radio system control and the first navigational radio system control affixed to the first bezel; and
    a second bezel surrounding the second display having the second communication radio system control and the second navigational radio system control affixed to the second bezel.

20. The system of claim 18, wherein during a failure of the first display, the second display backup.

21. The system of claim 18, wherein the controls on each of the displays provide backup to one another in the event of failure.

22. A method to control data on multiple cockpit instrument panels, comprising:
    adjusting first setting data associated with a first cockpit panel;

concurrently displaying the first setting data on the first cockpit panel and a second cockpit panel along with graphical information;

adjusting second setting data associated with the second cockpit panel; and concurrently displaying the second setting data on the first cockpit panel and the second cockpit panel.

23. The method of claim 22, wherein adjusting the second setting data occurs before adjusting the first setting data.

24. The method of claim 22, further comprising:

adjusting the first setting data from the second cockpit panel; and adjusting the second setting data from the first cockpit panel.

25. The method of claim 22, wherein in adjusting the first setting data, the first setting data are associated with communication radio control frequencies.

26. The method of claim 22, wherein in adjusting the second setting data, the second setting data are associated with navigational radio control frequencies.

27. The method of claim 22, wherein the adjusting of the first setting data occurs by tuning a control located on a first bezel, wherein the first bezel surrounds a first display.

28. The method of claim 27, wherein the adjusting the second setting data occurs by tuning a control located on a second bezel, wherein the second bezel surrounds a second display.

* * * * *